United States Patent [19]

Stevenson

[11] Patent Number: 5,058,284
[45] Date of Patent: Oct. 22, 1991

[54] PRECISION GAUGE ASSEMBLY

[76] Inventor: James T. Stevenson, Cottage Street, Meriden, Conn. 06450

[21] Appl. No.: 613,059

[22] Filed: Nov. 15, 1990

[51] Int. Cl.$^5$ .............................................. G01B 3/56
[52] U.S. Cl. ....................................... 33/535; 33/475; 33/471
[58] Field of Search ................. 33/471, 475, 533, 534, 33/535, 567.1, 403, 421

[56] References Cited

U.S. PATENT DOCUMENTS

| | | | |
|---|---|---|---|
| 1,427,132 | 8/1922 | Swartout | 33/535 X |
| 2,163,023 | 6/1939 | Cierpial | 33/403 |
| 2,397,280 | 3/1946 | Leszak | 33/535 X |
| 2,487,844 | 11/1949 | Bigham | 33/501 X |

OTHER PUBLICATIONS

American Machinist—Precision Square p. 191, 1/16/47.

Primary Examiner—Harry N. Haroian
Attorney, Agent, or Firm—Melvin I. Stoltz

[57] ABSTRACT

By mounting a longitudinally extending blade with a mounting block for pivotal movement about an axis perpendicular to the longitudinal axis of the blade, in combination with a distance measuring meter mounted to measuring engagement with the movable blade, a precision squareness measuring gauge assembly is achieved for providing highly accurate measurements of the angular relationship of one surface to a reference surface. In the preferred embodiment, the precision measuring gauge assembly also incorporates pivot limiting means for controlling the arcuate distance through which the blade is able to pivot. In this way, the entire arcuate travel distance of the blade is accurately measured and displayed on the meter, thereby providing a direct accurate measurement of any desired surfaces.

6 Claims, 2 Drawing Sheets

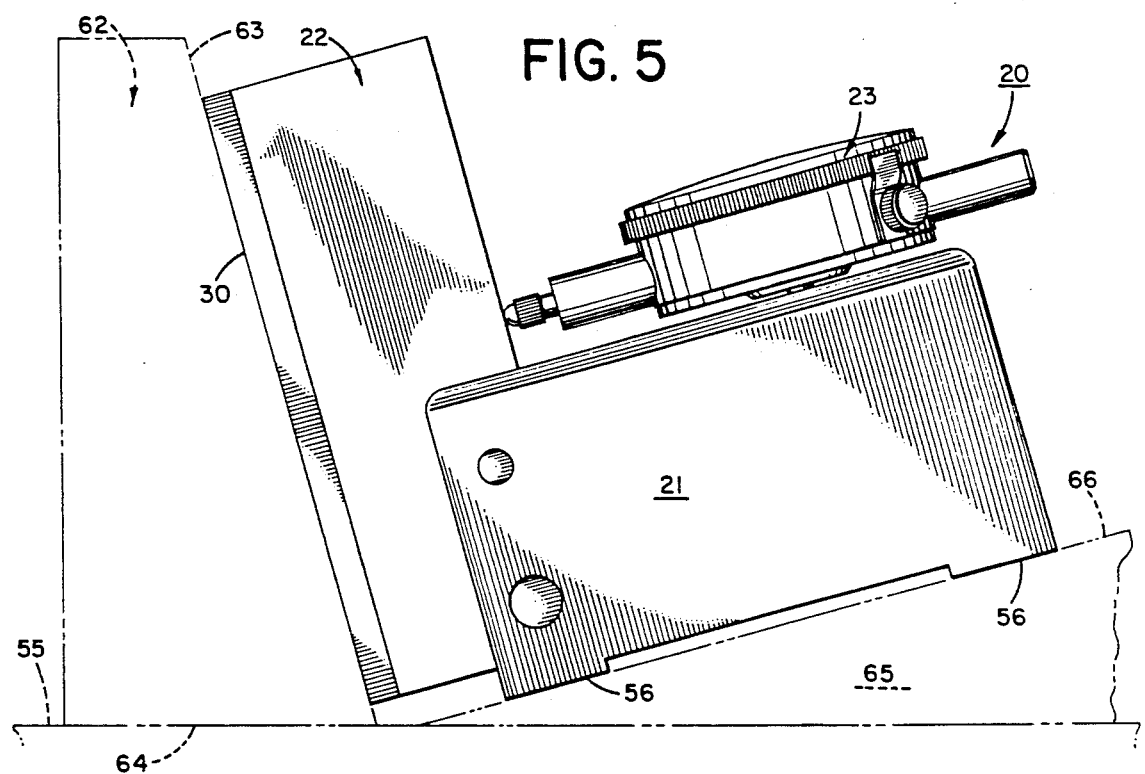
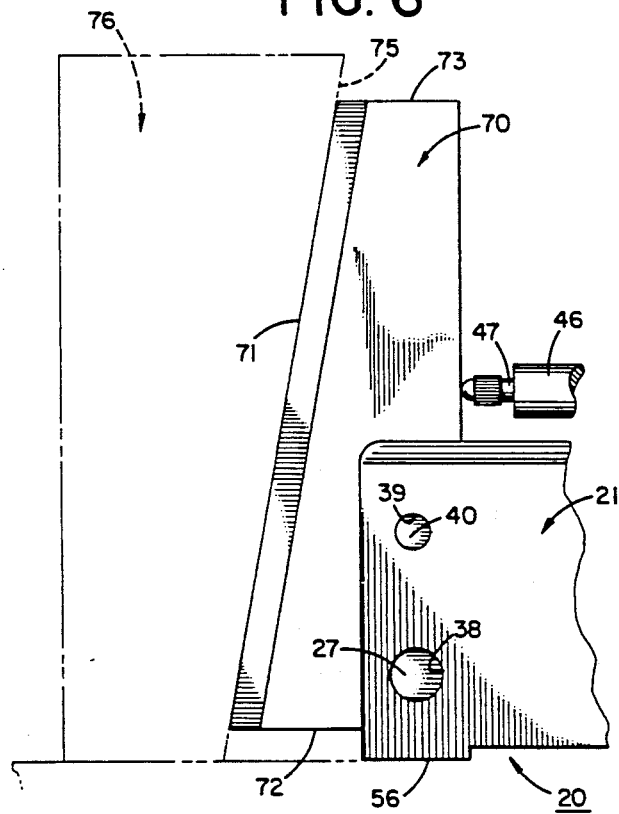
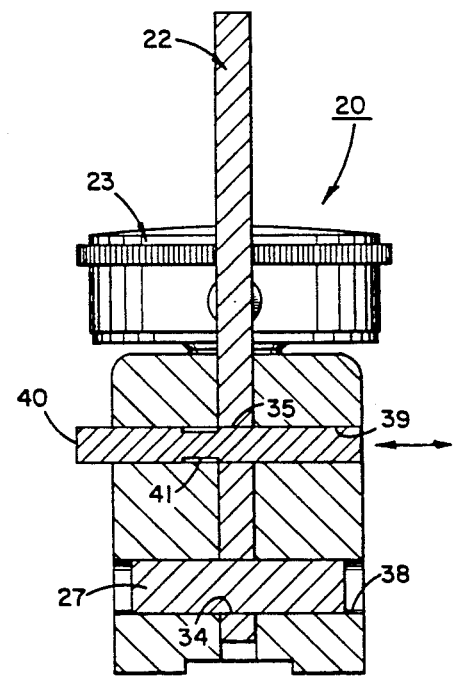

PRECISION GAUGE ASSEMBLY

TECHNICAL FIELD

This invention relates to gauge assemblies and more particularly to a precision gauge assembly for measuring the squareness or angular relationship of one surface of an object to an adjacent surface thereof.

BACKGROUND ART

During the manufacture of most components and, in particular, precision components, it is important that the dimensions and angular relationships of surfaces of the components be measured in order to assure accuracy and provide confidence that the product is being manufactured within the allowable dimensional tolerances. In most manufacturing installations, component inspection to assure that the component is properly manufactured within the allowable tolerances requires highly experienced personnel, as well as expensive and sophisticated equipment.

Typically, components are completely manufactured and then sent to a special inspection station where angular relationships and dimensions for the component are measured to assure that the component complies with the drawing requirements. This procedure is both laborious and expensive, due to the level of sophistication required by the individual making the measurements, as well as due to the expensive nature of the equipment required by the inspector.

In order to improve the speed and efficiency of the individuals charged with the duty of inspecting the manufacturing tolerances of component parts, various gauges have been developed. However, these gauges all require a high level of sophistication in order to assure their proper use and accurate employment.

One of the typical problems encountered with prior art gauge assemblies is the requirement that the individual employing the gauge must develop a unique skill in holding the gauge relative to the component being measured in order to obtain an accurate measurement thereof. Since the measurements being made for most sophisticated components require extreme precision, the particular orientation or measurement technique employed by the user is of particular importance.

If a gauge is not held in precisely the correct manner relative to the manufactured component, inaccurate readings will be obtained. Consequently, the undesirable expense of requiring highly skilled and trained individuals has become a necessity in order to assure that the sophisticated manufactured component parts are all within the required specifications.

In addition, in measuring the angular relationships between adjacent surfaces in order to assure that the surfaces have been formed in the precisely desired orientation and configuration, the prior art gauges are capable of only providing information on whether the precisely desired surface orientation has been attained. However, these prior art gauges are incapable of providing a precise read-out of the deviation that particular component may have from the desired position.

In particular, in one frequently observed condition, components are manufactured with surfaces that must be maintained perpendicular relative to its adjacent surface. In order to measure the perpendicularity of one surface to another, the skilled, trained inspector would employ a squareness gauge on a precision ground measuring table in order to establish whether the desired manufactured surface has been constructed perpendicular to the surface placed on the measuring table. However, in providing this structural inspection, the resulting information is capable of only informing the inspector whether the surface being measured is, or is not, precisely perpendicular to the reference surface. However, the squareness gauge employed is incapable of providing the inspector with any detailed information concerning the precise measurement of deviation or variation from perpendicularity.

Therefore, it is a principal object of the present invention to provide a precision gauge assembly capable of measuring the squareness of an object, while also providing a precision metered reading of the deviation the surface possesses from the desired goal.

Another object of the present invention is to provide a precision gauge assembly having the characteristic features described above which is capable of measuring any angular relationship between surfaces while providing a metered reading for any deviation from the desired reading.

Another object of the present invention is to provide a precision gauge assembly having the characteristic features described above which is capable of measuring tolerances within plus or minus 0.0001 inches, as well as being capable of defining an error and providing deviation readings to plus or minus 0.0001 inches.

A further object of the present invention is to provide a precision gauge assembly having the characteristic features described above which enables measurements to be made more rapidly, more efficiently, and more accurately than presently attainable using existing systems.

Another object of the present invention is to provide a precision gauge assembly having the characteristic features described above which is capable of being employed by individuals with little or no training, thereby enabling all individuals to obtain precision measurements of manufactured components.

Another object of the present invention is to provide a precision gauge assembly having the characteristic features described above in which a plurality of alternately shaped measuring blades can be quickly and easily mounted thereto, enabling any desired angular relationships to be measured with precision and accuracy.

A further object of the present invention is to provide a precision gauge assembly having the characteristic features described above which is capable of being quickly and easily checked for accuracy, in order to assure continuous, trouble-free, accurate component measurements.

Other and more specific objects will in part be obvious and will in part appear hereinafter.

SUMMARY OF THE INVENTION

In the present invention, the difficulties and inabilities of the prior art gauge systems have been completely eliminated, and accurate, repeatable measurements are attained quickly and easily, while also providing a precise meter reading of any deviation found on a component being measured. In order to attain this result and eliminate the prior art inabilities, the precision gauge assembly of this invention employs a support block to which a longitudinally extending, elongated measuring blade is pivotally mounted near one of its ends, with a movement responsive indicator or meter measuringly engaged with one longitudinally extending edge of the measuring blade.

In addition, the longitudinally extending blade also incorporates movement limiting means for controlling the arcuate distance through which the measuring blade is capable of pivoting. In this way, the indicator or meter engaged therewith is capable of accurately measuring all of the distances through which the elongated blade is capable of arcuately pivoting.

In the present invention, the support base and the elongated measuring blade are both manufactured from material which is capable of being constructed with precision and maintaining that precision throughout its use. Preferably, such material as heat-treated stainless steel is employed. In addition, the surface of the support base which is positioned on a measuring table is also constructed in a manner which assures that the surface thereof is substantially flat, with such flatness being maintained regardless of temperature changes or variations.

By employing the present invention, the angular relationship of one surface to an adjacent surface can be quickly and easily measured, while also obtaining the precise measurement or reading of the amount of error existing, if any error is found. Prior to use of the precision gauge assembly of this invention, the elongated measuring blade would be set by employing a conventional measuring table so that the measuring edge of the elongated blade is precisely perpendicular to the reference base of the support block and/or the measuring table. With the indicator set at zero, under this pre-set condition, the precision gauge of this assembly is ready to measure any surface for squareness relative to an adjacent surface of the component part.

When such a measurement is made on a desired component part, if the measuring blade abuts the surface which is perfectly perpendicular to the adjacent surface or the measuring table, the meter would read zero, thereby showing that the component surface has attained the precisely desired angular orientation relative to the adjacent surface. However, if the surface being measured deviates to any degree from perpendicularity, the surface being measured causes a portion of the elongated measuring edge of the blade to be pivoted about the pivot axis of the blade, in one direction or the other.

With the meter in contacting, following engagement with the opposed edge of the measuring blade, any movement of the measuring blade is displayed on the dial of the meter. Consequently, by merely observing the reading of the meter, the user is capable of immediately and accurately obtaining a precision measurement of the distance the surface being measured deviates from the desired perpendicularity. With this information being obtained for various locations along the surface of a component part, the need for correction, as well as the amount of correction required, is quickly and easily determined and the component part is returned for being converted rapidly from one which is out of tolerance to one that is within the desired tolerances.

The invention accordingly comprises the features of construction, combinations of elements and arrangement of parts which will be exemplified in the constructions hereinafter set forth and the scope of the invention will be indicated in the claims.

THE DRAWINGS

For a fuller understanding of the nature and objects of the invention, reference should be had to the following detailed description taken in connection with the accompanying drawings in which:

FIG. 5 is a side elevation view showing the precision gauge assembly of this invention mounted on a measuring table in contact with a component and supported on a side plate, all of which are shown in phantom;

FIG. 6 is a side elevation view partially broken away of the precision gauge assembly of this invention shown with an optional elongated blade member mounted therein in measuring engagement with a component part and mounted on a measuring table, with both the component and table shown in phantom; and FIG. 7 is a cross-sectional front elevation view taken along line 7—7 of FIG. 1.

DETAILED DESCRIPTION

Figure 1:
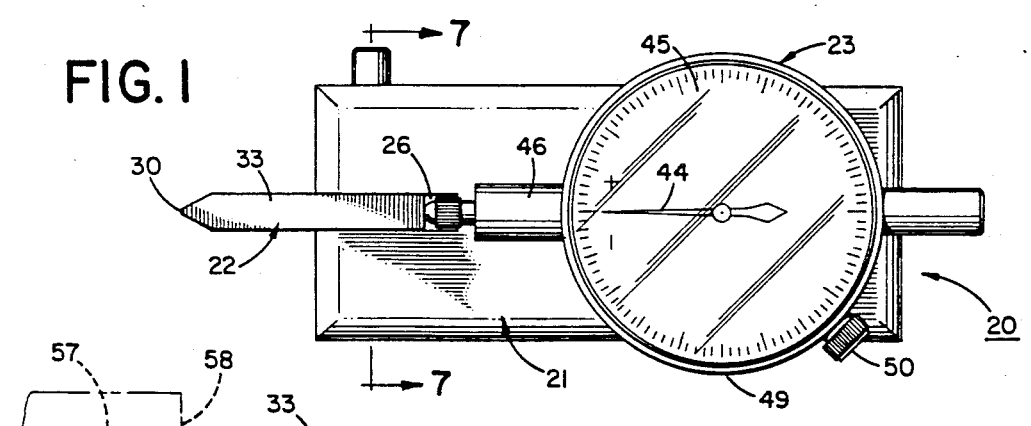
FIG. 1 is a top plan view of the precision gauge assembly of this invention.
Figure 2:
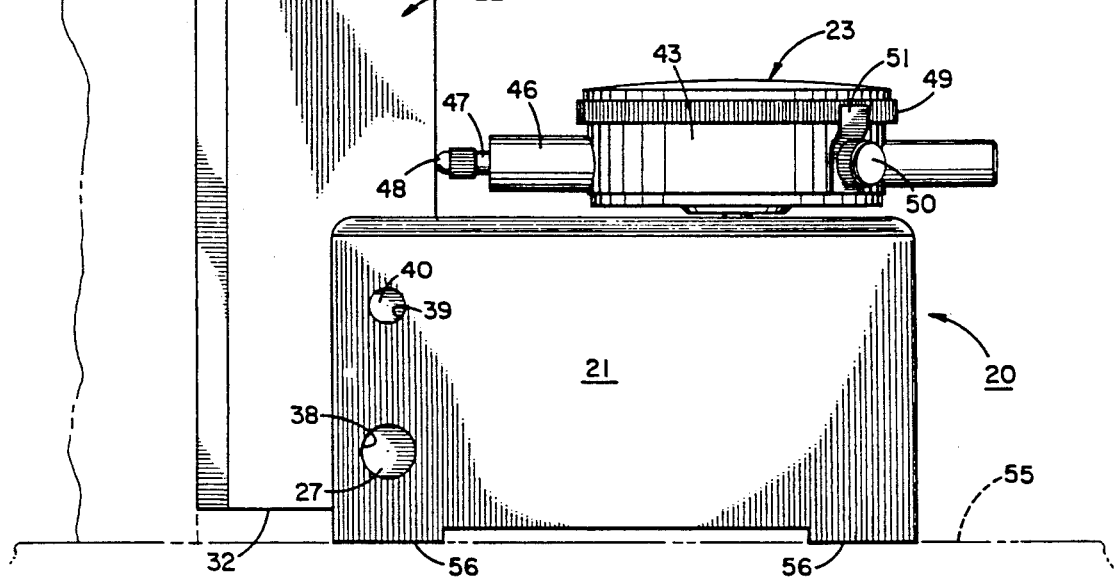
FIG. 2 is a side elevational view of the precision gauge assembly of this invention depicted on a measuring table in contact with a component part, both of which are shown in phantom.

As best seen in FIGS. 1, 2, and 5, precision gauge assembly 20 of the present invention comprises a support block 21, elongated measuring blade 22, and a meter 23. As shown throughout the figures, support block 21 incorporates a vertically oriented slot 26 formed in one end thereof which is constructed for receiving and supportingly retaining measuring blade 22. Preferably, support block 21 is formed from dense or heavy material in order to enhance its stability and rigidity during use, and measuring blade 22 is preferably mounted in slot 26 of support block 21 for pivotal movement relative thereto.

In its preferred embodiment, elongated measuring blade 22 comprises a component contacting edge 30, which is carefully constructed to be perfectly flat, within normal tolerance limits, throughout its length. By assuring that no perceptible deviations occur in component contacting edge 30, the accuracy of blade 22 is provided for measuring contact with any component. In addition, blade 22 also incorporates a rear elongated edge 31 and side edges 32 and 33.

Figure 3:
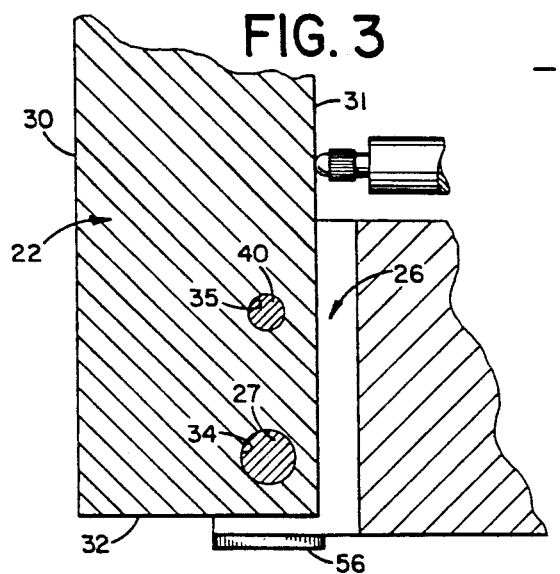
FIG. 3 is a cross-sectional side elevation view, partially broken away, taken along line 3—3 of FIG. 1.
Figure 4:
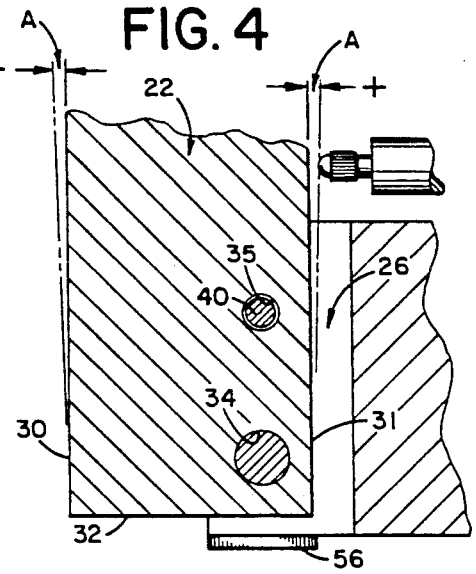
FIG. 4 is a cross-sectional side elevation view similar to the view of FIG. 3 depicting the arcuate movability of the elongated measuring blade.

The construction of elongated measuring blade 22 is completed by forming two through holes 34 and 35 in blade 22 perpendicularly to the flat side surfaces of blade 22. In addition, as best seen in FIGS. 3 and 4, holes 34 and 35 are formed in blade 22 adjacent side edge 32, inwardly of rear edge 31, with the central axis of holes 34 and 35 in aligned relationship with rear edge 31. Preferably, the central axis of each of the through holes 34 and 35 is spaced away from edge 31 at the precisely identical distance.

In order to complete the pivotal securement of blade 22 to support block 21, a pin receiving hole 38 is formed near the base of mounting block 21 and extending through elongated slot 26. Blade 22 is then pivotally mounted to supporting block 21 by securely affixing edge 32 of blade 22 in slot 26 of mounting block 21 by frictionally engaging an anchor pin 27 in hole 38 of block 21, with pin 27 passing through receiving hole 34 of blade 22.

In the preferred embodiment, anchor pin 27 is frictionally engaged in mounting block 21 in order to prevent its unwanted dislodgement or removal therefrom. In addition, receiving hole 34 of blade 22 comprises a diameter substantially equivalent to the outer diameter of pin 27. In the preferred construction, the diameters of these components are precisely controlled in order to prevent lateral movement of blade 22 relative to pin 27, while allowing pivoting movement of blade 22 about the central axis defined by pin 27.

In order to control the arcuate movement of elongated blade 22 about the central axis of anchor pin 27, support block 21 incorporates lock pin receiving hole 39 which is constructed similar to anchor pin receiving hole 38 and has a central axis parallel thereto. In addition, an axially movable, stepped, lock pin 40 is positioned in receiving hole 39 of support block 21, extending through hole 35 of elongated blade 22. As best seen in FIGS. 4 and 7, axially movable, stepped, lock pin 40 comprises an overall outer diameter which is slightly less than the diameter of receiving hole 39. In this way, pin 40 is capable of axial, sliding movement relative to support block 21.

In addition, lock pin 40 incorporates a stepped or recessed zone 41, which comprises a diameter less than the overall outer diameter of pin 40. In addition, the overall length of pin 40 is greater than the width of mounting block 21, thereby assuring that a portion of lock pin 40 extends beyond the sidewall of mounting block 21, for easy access by the user.

By employing this configuration, the user is capable of quickly and easily shifting between two alternate positions. One position is the locked position, wherein the diameter of pin 40 substantially corresponds with the diameter of hole 35 of blade 22. In this position, blade 22 is prevented from pivoting about a central axis established by anchor pin 27. This position is typically employed for using gauge assembly 20 as a conventional squareness gauge or for holding measuring blade 22 during transportation or when not in use.

During normal use, however, movable pin 40 is axially advanced to its alternate position, wherein reduced diameter, stepped zone 41 of pin 40 is positioned in alignment within receiving hole 35 of blade 22. When in this position, blade 22 is capable of arcuately pivoting about the central axis of anchor pin 27, within the confines of the diametric differences between hole 35 of blade 22 and the diameter of stepped zone 41. This arcuate movement is clearly shown in FIG. 4, wherein the arcuate distance blade 22 is capable of moving away from vertical at both its component contacting edge 30 and its rear edge 31 is shown by the letter "A".

In the preferred embodiment, meter 23 comprises a conventional measuring meter typically employed in dimensional or arcuate measurements. As typically found in meters of this construction, meter 23 incorporates a housing 43 in which the control mechanisms are contained. In addition, a calibrated dial or face 45 is provided on which the distance being measured is visually displayed for convenient reading. Needle 44 is rotationally mounted to face 45, in order to provide the desired means for reading the particular measurements.

Furthermore, meter 23 incorporates a substantially cylindrically shaped sleeve 46, radially extending from the housing 43. An elongated axially movable, spring biased, follower arm 47 is securely retained in sleeve 46, mounted for axial movement relative thereto.

In this conventional operation, elongated axially movable, spring biased follower arm 47 is controllably connected to needle 44 of meter 23, causing needle 44 to rotate about dial 45 whenever arm 47 axially moves in either direction. Consequently, by positioning arm 47 with its contact head 48 in a first position, with that position being noted, or the meter being set to zero, any movement or deviation from the first position is immediately displayed on meter 23. In this way, axial movement of follower arm 47 in either direction is accurately and precisely measured.

In the preferred embodiment, meter 23 also incorporates a rotation counter, which records the number of times needle 44 completes a 360° revolution about dial 45. In this way, the range of distances through which meter 23 can be employed is substantially increased, as well as its accuracy.

As shown throughout the drawings, meter 23 is mounted to the top surface of support block 21 in a conventional manner, with meter 23 securely affixed to support block 21 in the precisely desired position. This secure affixation to support block 21 is attained in any one of a plurality of conventional securement methods, such as threaded engagement in block 21 or anchoring of a post member extending from the surface of meter 23, such as through the rear surface of block 21. Regardless of which securement method is employed, meter 23 is immovably, securely mounted to support block 21, in a precisely desired position, with movable, elongated follower arm 47 in contacting engagement with rear edge 31 of measuring blade 22.

In addition, the spaced distance between contact head 48 of follower arm 47 and the pivot axis of blade 22 about anchor pin 27 is precisely controlled, in order to calibrate meter 23. With this spaced distance precisely established, the movement of needle 44 about dial 45 can be quickly and easily converted into the precise dimensional errors being measured.

It has been found that precision gauge assembly 20 of the present invention is most efficiently employed by first calibrating gauge assembly 20 for reading the precise angular relationship to be measured. Typically, precision gauge assembly 20 is most often used for measuring the perpendicularity or squareness of one surface to a particular reference surface or adjacent surface of the component. In performing such measurements, precision gauge assembly 20 of this invention would be calibrated by setting the meter to "zero" when edge 30 of blade 22 is precisely perpendicular to the reference surface. In this way, assurance is provided that component contacting edge 30 of measuring blade 22 will read any deviation from perpendicularity and cause meter 23 to move from its zero position.

In order to assist the user in setting the zero position and being able to conveniently read meter 23, meter 23 preferably incorporates a movable ring 49 which controllably rotates the numeral indicator of dial 45 through any desired position on the face of meter 23. In this way, wherever needle 44 is positioned when precision gauge assembly 20 of the present invention is calibrated to the precise, desired position, typically by contacting blade 22 with a precision made measuring block, the rotation of ring 49 enables the "zero" position to be set in direct alignment with needle 44. In order to securely lock ring portion 49 of meter 23 in the desired set position, thumb screw 50 and lock plate 51 are employed, first to release ring 49 and then securely lock ring 49 in the desired position.

Once precision gauge assembly 20 of this invention has been calibrated with component contacting edge 30 of elongated measuring blade 22 precisely positioned, as desired, with meter 23 being set to read the desired position as the "zero" position, precision measuring gauge 20 is ready for use. In calibrating blade 22 and meter 23, as well as during use of gauge assembly 20, movable pin 40 is positioned with stepped zone 41 aligned with receiving hole 35 of blade 22, as shown in FIG. 4. In this position, blade 22 is free to pivot about the axis defined by anchor pin 27, within the arcuate confines of receiving hole 35.

Once blade 22 has been released from its locked position or is removed from engagement with a measuring block, blade 22 arcuately pivots forwardly to its maximum extent, due to the spring biased axial movement of follower arm 47. Since the spring forces acting upon follower arm 47 cause arm 47 to be urged outwardly of sleeve 46, arm 47 and contact head 48 remain in biased abutting engagement with rear edge 31 of blade 22, causing blade 22 to rotate until abutment between pin receiving hole 35 of blade 22 and stepped zone 41 of pin 40 is reached.

With precision gauge assembly 20 ready for use, support block 21 is positioned on a measuring table 55, depicted in FIG. 2 in phantom. In addition, in constructing support block 21, the base engaging surfaces 56 formed on the bottom of block 21 are constructed to be precisely flat and horizontal. In this way, precision measurements are attained.

In FIG. 2, a component 57, shown in phantom, is depicted being measured for squareness by positioning component 57 on measuring table 55 and bringing component contacting edge 30 of measuring blade 22 into engagement with surface 58 to be measured. If meter 23 returns to its calibrated "zero" position, the operator knows that surface is precisely perpendicular to table surface 55. By employing precision gauge assembly 20, the user is immediately informed of the precise measurement being made by quickly and easily referring to meter 23.

If surface 58 of component 57 is not precisely perpendicular, as desired, precision gauge assembly 20 also informs the operator of the precise deviation surface 58 has from perpendicularity. Regardless of which direction surface 58 is angularly disposed relative to measuring table surface 55, the angular deviation causes component contacting edge 30 to be angularly displaced from its vertically calibrated position, due to the spring force exerted on rear edge 31 by pin 47.

Due to this spring force, component contacting edge 30 of blade 22 is always engaged with surface 58 of component 57, enabling meter 23 to show the precise arcuate distance or measured distance surface 58 deviates from the desired dimension. With this deviation precisely known by reading meter 23, the operator can re-machine component 57 with greater precision and accuracy, knowing the exact distance or dimensional inaccuracy surface 58 possesses. As a result, extremely accurate readings are made quickly and easily using gauge assembly 20.

In addition to measuring the squareness or perpendicularity of one particular surface to a measuring table or an adjacent surface of the component, precision gauge assembly 20 of this invention can also be employed to measure any desired angular dimensions. Such measurements can be achieved in various alternate ways, as depicted in FIGS. 5 and 6.

In FIG. 5, precision measuring gauge assembly 20 of this invention is depicted measuring a component 62, shown in phantom, in order to determine if surface 63 thereof possesses the precisely desired angular relationship to measuring table 55 or bottom surface 64 of component 62.

In this embodiment, precision gauge assembly 20 comprises the identical construction detailed above, with measuring blade 22 being calibrated as detailed above for assuring that component contacting edge 30 is precisely perpendicular to base engaging surfaces 56 of support block 21. Once calibrated, precision gauge assembly 20 is positioned on an angle plate or sign plate 65, which has been adjusted to assure that support surface 66 thereof is positioned in the precise angular relationship to measuring table 55 needed to form the complement of the angle of surface 63 being measured. As a result, when precision gauge assembly 20 is placed on surface 66 of sign plate 65, the angular distance between surface 66 and surface 63 of component 62 comprises exactly 90°, and blade 22 can be used in the manner detailed above for determining whether surface 63 of component 62 has been constructed with the precisely desired angle.

In FIG. 6, an alternate embodiment for gauge assembly 20 of this invention is depicted. In this embodiment, gauge assembly 20 comprises an elongated measuring blade 70 mounted thereto, instead of blade 22. Blade 70 is constructed in a manner similar to blade 22 and is mounted to support block 21 in the precisely identical manner detailed above in relationship to blade 22. The sole distinguishing feature of measuring blade 70 is the construction of component contacting edge 71 at a precisely desired angular relationship relative to its side edges 72 and 73, which will enable direct measurement of a desired surface.

In this embodiment, component contacting agent 70 is constructed with the precisely desired angle required for measuring the angular relationship of surface 75 of component 76, shown in phantom in FIG. 6. Once blade 70 has been calibrated, in a manner similar to that detailed above, by employing a precision made calibration block to assure component contacting edge 71 measures the precisely desired angle, gauge assembly 20 of this invention is ready to be employed in determining the precise angular relationship of surface 75 of component 76 to the desired reference surface.

As is apparent from the preceding description, a measuring blade of any desired configuration or angular construction can be manufactured in order to measure the precise surface construction of any particular component. In addition, by employing the precision gauge assembly of this invention, any desired surface can be quickly and easily measured with high precision and accuracy, providing the user with an immediate and accurate measured reading of the distance the component being measured deviates from the desired goal. Consequently, by employing the present invention, components can be manufactured more accurately, as well as having the accuracy determined quickly, easily and efficiently.

It will thus be seen that the objects set forth above, among those made apparent from the preceding description are efficiently attained and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A precision gauge assembly for measuring the angular relationship of one surface to another surface, said gauge assembly comprising:
   A. a mounting block comprising:
      a. a blade receiving slot formed in a first surface thereof,
      b. a first pin receiving passageway
         1. formed in a second surface of the mounting block adjacent to the first surface, and
         2. extending through said receiving slot, and
      c. a second pin receiving passageway
         1. positioned in juxtaposed, spaced relationship to the first pin receiving passageway, and
         2. having a central axis substantially parallel to the central axis of the first pin receiving passageway;
   B. an elongated measuring blade comprising
      a. a substantially flat elongated member incorporating a component contacting edge and a rear edge, and
      b. a pair of pin receiving holes formed therein substantially perpendicular to the planar surface thereof, said holes being spaced for cooperative alignment with the pin receiving passageways of the mounting block;
   C. first pin means constructed for mounted engagement in the first pin receiving passageway of the mounting block and the first pin receiving hole of the blade for supportingly mounting and maintaining the elongated measuring blade in pivotal engagement with the mounting block;
   D. second pin means
      a. comprising at least two separate and distinct axially elongated zones,
         1. the first zone comprising a first diameter substantially equal to the diameter of the pin receiving hole of the measuring blade, and
         2. the second zone comprising a diameter smaller than the first diameter, and
      b. positioned in sliding, axially movable mounted engagement in the second pin receiving passageway of the mounting block and the second hole of the elongated measuring blade with the second pin means being alternately axially movable for aligning each of said zones within the pin receiving hole of the measuring blade, whereby the second pin means is axially movable between at least a first blade locking position and a second position for controlling and defining the arcuate movement of the elongated measuring blade relative to the mounting block; and
   E. a meter for obtaining and displaying accurate measurements
      a. securely affixed to the mounting block adjacent the rear edge of the measuring blade, and
      b. incorporating an axially movable, spring-biased arm member
         1. constructed for providing accurate measurements to the meter,
         2. positioned in contacting, following, measuring engagement with the rear edge of the measuring blade,
         3. biasingly forcing the measuring blade to pivot in a first direction, and
         4. being responsive to the movement of the measuring blade for continuously following and accurately measuring said pivotal movement.

2. The precision gauge assembly defined in claim 1, wherein said first pin means and said second pin means are further defined as being removably mounted to said mounting block, thereby enabling said elongated blade to be changed when desired.

3. The precision gauge assembly defined in claim 2, wherein said component contacting edge and said rear edge are further defined as being substantially parallel to each other.

4. The precision gauge assembly defined in claim 2, wherein said elongated measuring blade is further defined as comprising a component contacting edge which is angularly disposed relative to the rear edge thereof, thereby defining a slanted component contacting edge.

5. The precision gauge assembly defined in claim 1, wherein the mounting block is further defined as comprising at least one precision ground reference surface.

6. The precision gauge assembly defined in claim 1, wherein said block is further defined as being formed from material substantially heavier than the blade, thereby providing stability to the entire gauge assembly.

* * * * *